(No Model.)

J. E. A DAL.
MUSTACHE GUARD.

No. 561,868. Patented June 9, 1896.

WITNESSES
Franck L. Ourand
A. B. Suit

INVENTOR
John E<sup>a</sup> Dal
By Benj. G. Cowl
Attorney

UNITED STATES PATENT OFFICE.

JOHN E. A DAL, OF HAINES CITY, FLORIDA.

MUSTACHE-GUARD.

SPECIFICATION forming part of Letters Patent No. 561,868, dated June 9, 1896.

Application filed July 3, 1895. Serial No. 554,889. (No model.)

*To all whom it may concern:*

Be it known that I, JOHN E. A DAL, a citizen of the United States, residing at Haines City, in the county of Polk and State of Florida, have invented certain new and useful Improvements in Mustache-Guards; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in mustache-guards for preventing food and liquids coming in contact with and adhering to the mustaches during the act of eating or drinking, thereby keeping them in a clean condition and preventing the clothing from being soiled by droppings or drippings therefrom.

The object of the invention is to provide a spring-clamp mustache-guard which can be readily attached to the mustache at each side of the mouth and the same be gathered or bunched and held out of the way in eating or drinking.

The invention consists in the novel construction and combination of parts as hereinafter fully described and shown.

Figure 1:
Figure 2:
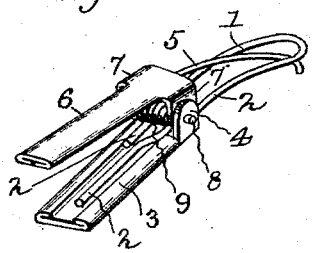

In the accompanying drawings, Figure 1 is a view showing how the device appears when in use. Fig. 2 is a perspective view of one of the guards.

In the said drawings, referring now to Fig. 2, the reference-numeral 1 designates a bail consisting of a wire bent over at the center, forming two arms 2, to which is soldered a plate 3, forming a handle or finger-hold, formed at its inner ends with apertured lugs 4.

The numeral 5 designates an arm, soldered or otherwise secured to a plate 6, having apertured lugs 7, registering with lugs 4. Passing through these lugs is a pintle 8, forming a pivot for said arms, and encircling the same is a coiled spring 9, one end of which is secured to plate 3, while the other is secured to plate 6, the tendency of which is to force the bail and arm toward each other and clamp the mustache and hold it out of the way.

There are two of these guards employed in practice, one at each side of the mouth.

From the above it will be seen that the mustaches are clamped and held between the bail and arm by spring-pressure, which bunches and holds them out of the way.

Having thus fully described my invention, what I claim is—

The herein-described mustache-guard, comprising a handle, and a bail formed of a piece of bent wire, a spring-actuated plate provided with an arm projecting into the bail and pivoted between apertured lugs, substantially as set forth.

In testimony whereof I affix my signature in presence of two witnesses.

JOHN E. A DAL.

Witnesses:
CLAUDE O. STROUD,
A. J. ROBERTSON.